United States Patent
Giefers et al.

(10) Patent No.: US 9,703,573 B1
(45) Date of Patent: Jul. 11, 2017

(54) INTERPOSER FOR DYNAMIC MAPPING OF API CALLS

(71) Applicant: International Business Machines Corporation, Armonk, NY (US)

(72) Inventors: Heiner Giefers, Langnau am Albis (CH); Raphael Polig, Dietikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/139,314

(22) Filed: Apr. 26, 2016

(51) Int. Cl.
  *G06F 13/00* (2006.01)
  *G06F 9/44* (2006.01)

(52) U.S. Cl.
  CPC .................. *G06F 9/4425* (2013.01)

(58) Field of Classification Search
  CPC .............................. G06F 9/44521; G06F 9/541
  USPC .................................................. 719/328, 331
  See application file for complete search history.

(56) References Cited

U.S. PATENT DOCUMENTS

| | | | |
|---|---|---|---|
| 6,871,341 B1 | 3/2005 | Shyr | |
| 8,375,368 B2 | 2/2013 | Tuck | |
| 8,375,392 B2 * | 2/2013 | Becchi | G06F 9/5044 718/102 |
| 2010/0156888 A1 | 6/2010 | Luk | |

FOREIGN PATENT DOCUMENTS

| | | |
|---|---|---|
| WO | WO 2014087268 A1 | 6/2014 |
| WO | WO 2015052501 A1 | 4/2015 |

OTHER PUBLICATIONS

Michela Becchi et al, "Data-aware scheduling of legacy kernels on heterogeneous platforms with distributed memory". SPAA '10 Proceedings of the twenty-second annual ACM symposium on Parallelism in algorithms and architectures, pp. 82-91, Jun. 13-15, 2010.

(Continued)

*Primary Examiner* — Andy Ho
(74) *Attorney, Agent, or Firm* — Daniel P. Morris; Otterstedt, Ellenbogen & Kammer, LLP

(57) ABSTRACT

Embodiments are directed to a heterogeneous system for dynamically mapping library calls to one of a plurality of processing platforms. The plurality of processing platforms include a central processing unit (CPU) and one or more acceleration units as co-processing units. The system includes an interposer configured to intercept the library calls from an application programming interface (API) and to map the library calls to one of the plurality of processing platforms according to a classification scheme based on an affinity table. The affinity table includes call signatures representing input parameters of sample library calls. Furthermore, the affinity table includes one or more performance parameters of the sample library calls for each of the processing platforms. The performance parameters indicate the performance of the sample library calls on the respective processing platform. Also included are a related method and a related computer program product.

20 Claims, 8 Drawing Sheets

(56) References Cited

OTHER PUBLICATIONS

Beisel, T et al, "Using shared library interposing for transparent application acceleration in systems with heterogeneous hardware accelerators". 2010 21st IEEE International Conference on Application-specific Systems Architectures and Processors (ASAP). pp 65-72.
João Colaço et al, "Transparent Application Acceleration by Intelligent Scheduling of Shared Library Calls on Heterogeneous Systems". Parallel Processing and Applied Mathematics, vol. 8384 of the series Lecture Notes in computer Science pp. 693-703, Date: May 6, 2014.
Vaz, G et al, "Deferring accelerator offloading decisions to application runtime". 2014 International Conference on ReConFigurable Computing and FPGAs (ReConFig), pp. 1-8 2014.

\* cited by examiner

| Signature | Count | Run Time | Energy |
|---|---|---|---|
| ... | ... | ... | ... |
| ... | ... | ... | ... |
| ... | ... | ... | ... |

CPU — 701

| Signature | Count | Run Time | Energy |
|---|---|---|---|
| ... | ... | ... | ... |
| ... | ... | ... | ... |
| ... | ... | ... | ... |

GPU — 702

| Signature | Count | Run Time | Energy |
|---|---|---|---|
| ... | ... | ... | ... |
| ... | ... | ... | ... |
| ... | ... | ... | ... |

FPGA — 703

INTERPOSER FOR DYNAMIC MAPPING OF API CALLS

BACKGROUND

The invention is notably directed to a heterogeneous system for dynamically mapping library calls of an application programming interface (API) to one of a plurality of processing platforms.

The invention further concerns a related method and a related computer program product.

The efficient use of accelerators in heterogeneous systems requires programmers who are familiar with the hardware architecture of the accelerator devices. However, application programmers are often not familiar with the hardware architecture of the accelerator devices and would like to focus on their application code. Accordingly application programmers normally rely on optimized software libraries.

SUMMARY

According to a first aspect, the invention is embodied as a heterogeneous system for dynamically mapping library calls to one of a plurality of processing platforms. The plurality of processing platforms comprise a central processing unit (CPU) and one or more acceleration units as co-processing units. The system comprises an interposer configured to intercept the library calls from an application programming interface (API) and to map the library calls to one of the plurality of processing platforms according to a classification scheme based on an affinity table. The affinity table comprises call signatures representing input parameters of sample library calls. Furthermore, the affinity table comprises one or more performance parameters of the sample library calls for each of the processing platforms. The performance parameters indicate the performance of the sample library calls on the respective processing platform.

According to another aspect of the invention a computer-implemented method for dynamically mapping library calls to one of a plurality of processing platforms is provided. The plurality of processing platforms comprise a central processing unit (CPU) and one or more acceleration units as co-processing units. The method comprises intercepting the library calls from an application programming interface (API) and mapping the library calls to one of the plurality of processing platforms according to a classification scheme based on an affinity table. The affinity table comprises call signatures representing input parameters of sample library calls and one or more performance parameters of the sample library calls for each of the processing platforms. The performance parameters indicate the performance of the sample library calls on the respective processing platform.

According to yet another aspect a computer program product for dynamically mapping library calls to one of a plurality of processing platforms of a heterogeneous system is provided. The plurality of processing platforms comprise a central processing unit (CPU) and one or more acceleration units as co-processing units. The computer program product comprises a computer readable storage medium having program instructions embodied therewith. The program instructions are executable by the system to cause the system to perform a method comprising intercepting the library calls from an application programming interface (API) and mapping the library calls to one of the plurality of processing platforms according to a classification scheme based on an affinity table. The affinity table comprises call signatures which represent input parameters of sample library calls and one or more performance parameters of the sample library calls for each of the processing platforms. The performance parameters indicate the performance of the sample library calls on the respective processing platform.

Embodiments of the invention will be described in more detail below, by way of illustrative and non-limiting examples, with reference to the accompanying drawings.

BRIEF DESCRIPTION OF THE DRAWINGS

FIG. 7 shows an example of an affinity table; and

DETAILED DESCRIPTION

Figure 1:
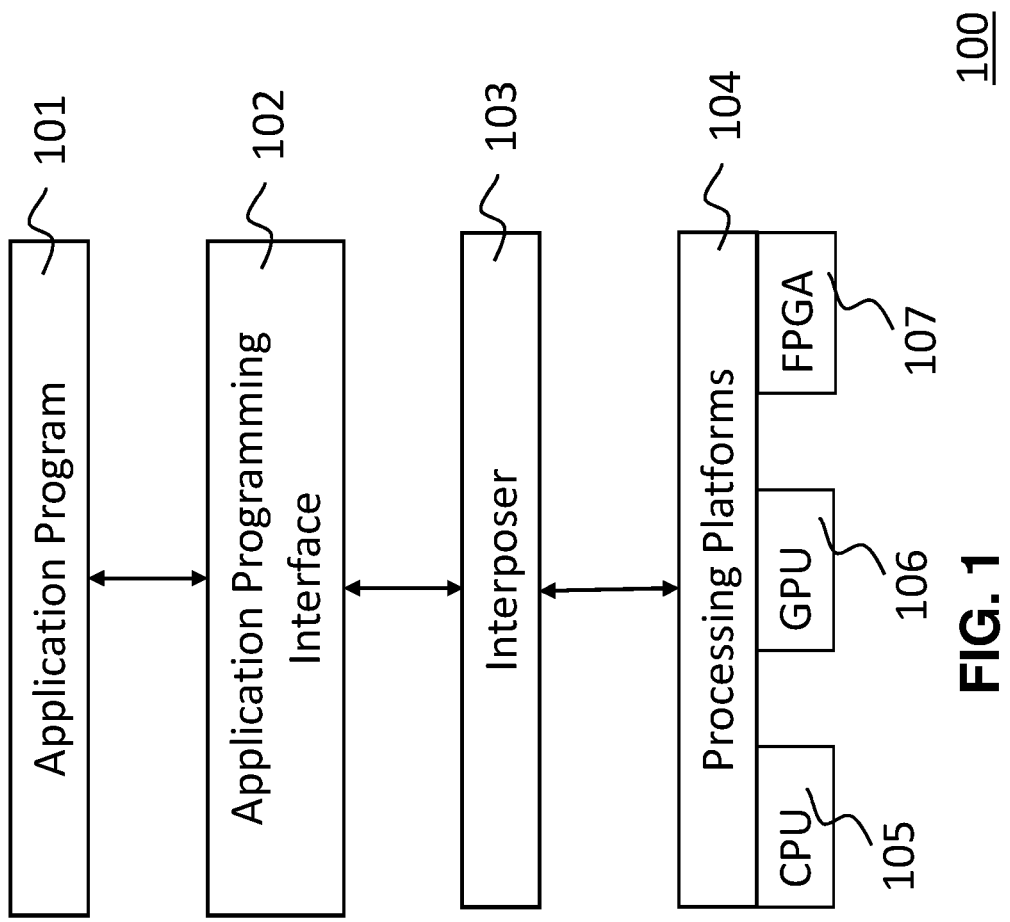
FIG. 1 illustrates a block diagram of a heterogeneous system according to an embodiment of the invention.

FIG. 1 illustrates a block diagram of a heterogeneous system 100 according to an embodiment of the invention.

The heterogeneous system 100 is provided for dynamically mapping library calls issued by an application program 101 to an application programming interface (API, 102). The heterogeneous system 100 comprises a plurality of processing platforms 104. The plurality of processing platforms 104 comprise a central processing unit (CPU, 105), a graphics processing unit (GPU, 106) and field programmable gate array (FPGA, 107). The GPU 106 and the FPGA 107 establish acceleration units as co-processing units for the CPU 105 that may be adapted to perform specific processing tasks in an accelerated way. The GPU 106 is particularly adapted to perform graphics processing and the FPGA 107 may be e.g. adapted to perform tasks such as matrix multiplications or fast Fourier transformations (FFTs). Between the API 102 and the processing platforms 104 an interposer 103 is provided. The interposer 103 is configured to intercept the library calls of the API 102 and to map the library calls to one of the processing platforms 104, i.e. either to the CPU 105, the GPU 106 or the FPGA 107.

The interposer 103 uses a classification scheme based on an affinity table. Such an affinity table is illustrated in FIG. 7. Referring now to FIG. 7, it shows an affinity table 700 comprising a sub-table 701 for the CPU 105, a sub-table 702 for the GPU 106 and a sub-table 703 for the FPGA 107. The affinity table 700 could also be considered as 3-dimensional table comprising the two-dimensional sub-tables 701, 702 and 703 for the respective processing platform.

Each of the sub-tables 701-703 of the affinity table 700 comprises a column 710 for the call-signatures. The call signatures represent input parameters of sample library calls. More particularly, the input parameters comprise one or more system state parameters and one or more library call parameters. The library call parameters may be in particular size parameters related to the size of the arguments of a function to be executed by the corresponding library. As an example, if the library call is a function call to perform a matrix multiplication, the library call parameters could be the numbers of rows and columns of the input matrices or more generally the dimensions of the input matrices. In other words, the size parameters indicate the problem size of the function that shall be performed by the library call.

The system state parameters could be any parameters that characterize the system state of the heterogeneous system 100 of the respective sample library call. According to embodiments the system state parameters may comprise the time of the sample library call, a temperature at the time of the sample library call such as the ambient temperature of the system 100 or the on-chip temperature of the system 100. Further parameters include the electric current of one or more components of the system 100, in particular the CPU 105, the GPU 106 and the FPGA 107. The former system state parameters could be classified as physical quantities of the system 100. A further class of possible system parameters include the utilization of the processing platforms, e.g. of the CPU 105, the GPU 106 and the FPGA 107. Further parameters in this class are the bandwidth utilization and the network utilization.

Furthermore, each of the sub-tables 701-703 of the affinity table 700 comprises a column 712 comprising the (expected) run time of the sample library call for the respective processing platform and a column 713 comprising the (expected) energy consumption or the expected average power consumption of the sample library call when performed on the respective processing platform. More generally, the columns 712 and 713 comprise performance parameters of the sample library calls for each of the processing platforms. The performance parameters indicate the performance of the sample library calls on the respective processing platform. The affinity table 700 may be populated with any kind and number of performance parameters as desired.

In addition, each of the sub-tables 701-703 of the affinity table 700 comprises a column 711 comprising a count value for the corresponding call-signatures. The count value indicates how often the performance parameters for the corresponding call signature have been measured. Accordingly the count value is a kind of reliability indicator for the performance parameters.

The system of FIG. 1 provides a kind of a drop in extension to enable transparent acceleration in heterogeneous systems using dynamic linking. This provides the advantage that the programmer can benefit from the acceleration units provided by such a system, e.g. the GPU 106 and the FPGA 107, without changing the code of the application program 101.

According to embodiments shared library functions for which an implementation for an acceleration unit (GPU 106, FPGA 107) exists in the heterogeneous system 100 are bundled in the interposer 103 which may be considered as a shim-layer library. The interposer 103 may also be used for marshalling/unmarshalling data if required by the respective acceleration unit (GPU 106, FPGA 107).

In operation, the dynamic linker of the API 102 is configured to check with the interposer 103 in case of a shared library call. If a library corresponding to the library call exists, the interposer 103 maps the library call to one of the processing platforms 104.

Figure 2:
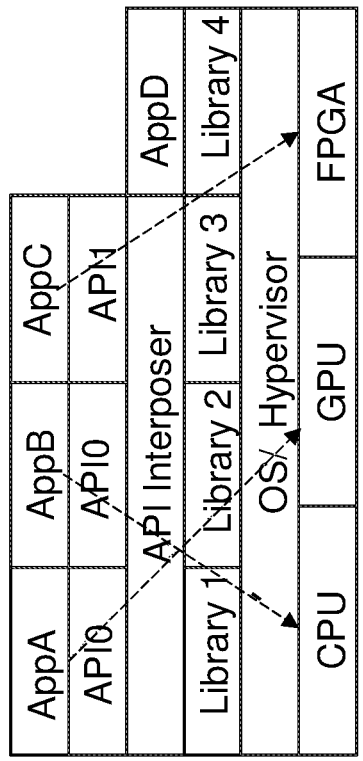
FIG. 2 shows a software stack of a heterogeneous system according to an embodiment of the invention.

FIG. 2 shows an example of a software stack 200 of the heterogeneous system 100 according to an embodiment of the invention. The software stack 200 comprises three application programs AppA, AppB, AppC and AppD. The application programs AppA and AppB apply to an application programming interface API0 and the application program AppC applies an application programming interface API1. The APIs API0 and API1 may be e.g. APIs such as Basic Linear Algebra Subprograms (BLAS), Linear Algebra Package (LAPACK) and Fastest Fourier Transform in the West (FFTW).

The software stack 200 comprises further a plurality of libraries Library 1, Library 2, Library 3 and Library 4. These libraries implement the APIs for the different processing platforms, namely the CPU 105, the GPU 106 and the FPGA 107. As an example, the library Library 1 could be e.g. an ATLAS implementation of the BLAS API for the CPU 105. The library Library 2 could be e.g. a CUBLAS implementation of the BLAS API for the GPU 106. And the library Library 3 could be e.g. a FPGA-BLAS implementation of the BLAS API for the FPGA 107. The library Library 4 may be statically linked to the application program AppD, while the APIs API0 and API1 perform a dynamic linking to the respective libraries. "The interposer 103 is arranged between the application program and the layer of libraries implementing the APIs API0 and API1"

In operation, the application programs AppA, AppB and AppC issue library calls to their APIs API0 or API1 respectively. The interposer 103 intercepts the library calls from the API API0 or the API API1 and maps the library calls to one of the processing platforms, i.e. the CPU 105, the GPU 106 or the FPGA 107.

Figure 3:
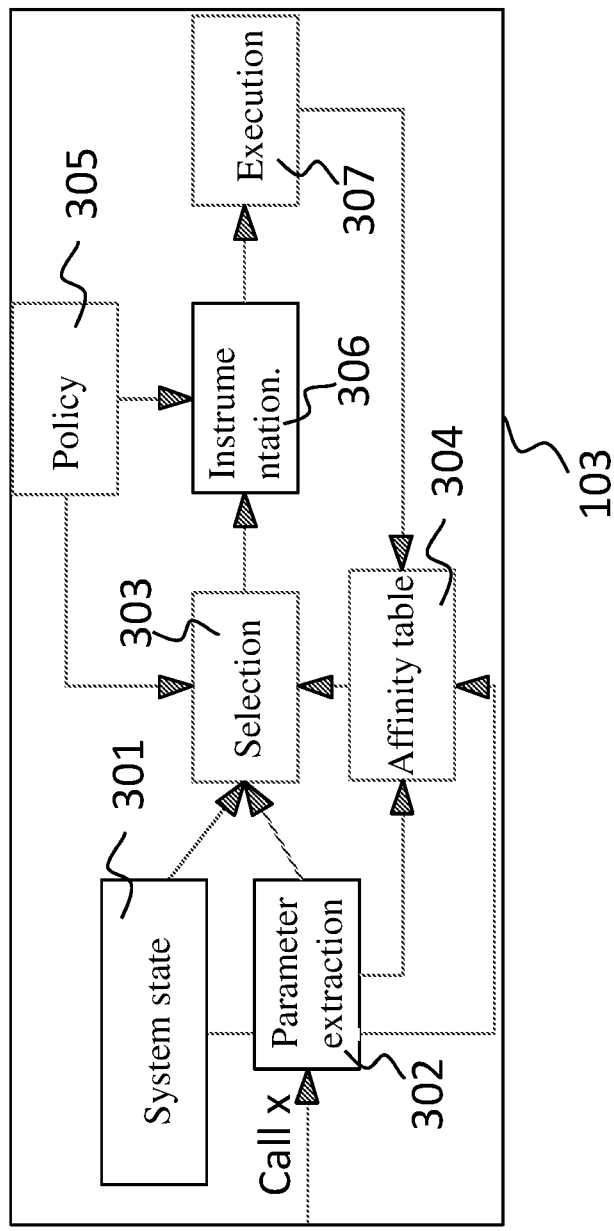
FIG. 3 illustrates functional blocks of an interposer of a heterogeneous system according to an embodiment of the invention.

FIG. 3 illustrates functional blocks of the interposer 103 of the heterogeneous system 100 of FIG. 1.

The interposer 103 comprises a system state module 301 for measuring one or more system state parameters of the heterogeneous system 100. For this the system state module 301 may receive input from one or more sensors. The sensors may be instrumented and read from the system 100 (host system) or a remote system.

The interposer 103 further comprises a parameter extraction module 302 for extracting one or more parameters of library calls to be mapped. A library call x is received and processed by the parameter extraction unit 302. The interposer 103 further comprises a selection module 303 for selecting one of the processing platforms 104 for the current library call. For the selection the selection module uses an affinity table module 304 that stores an affinity table, e.g. an affinity table as described with reference to FIG. 7. Furthermore, the selection of the selection module 303 is dependent on the policy according to which the interposer 103 operates at the respective point in time. The policy is provided by a policy module 305.

The current policy defines the mode of operation of the interposer 103. One mode of operation may be embodied as production mode in which the selection module 303 selects at runtime the best processing platform 104 for a library call. According to one embodiment the best processing platform may be considered as the processing platform that provides the fastest computation/processing of the current library call. According to other embodiments further factors may be considered for determining the best processing platform, e.g. the best processing platform may be considered as the processing platform that offers an optimal trade-off between the fastest processing time and the associated energy/power consumption.

According to another mode of operation the selection module 303 may additionally use a weight function that represents one or more system state parameters of the current system state. With such a weight function the selection module 303 may take into consideration the current state of the heterogeneous system 100. As an example, if the affinity table 700 indicates that the current library would be processed in the fastest manner on the FPGA 107, but the FPGA 107 is still 90% booked with processing other tasks, the selection unit 303 could take this high utilization of the FPGA 107 into account and select the CPU 105 instead for the processing of this task if the CPU 105 has currently a low utilization.

With such a weight function less utilized platforms may be favored. Alternatively the utilization could already be considered when generating the call signature.

According to another mode of operation the interposer 103 may operate in an auto-tune mode. Such an auto-tune mode may be considered as a training mode in which the interposer 103 learns which library calls are well-suited or not so well suited for the respective processing platforms 104. In this respect the interposer 103 performs test runs for sample library calls and feeds the performance results of these test runs to the affinity table module 304. Accordingly the selection module 303 selects randomly one of the processing platforms 104 for a received library call. Such a test run shall provide performance parameters for the processing of the library call. For this the interposer 103 comprises an instrumentation module 306 that inserts profiling code to the current program stream. The profiling code initializes the measurement of one or more performance parameters for the current library call. As an example, the profiling code may specify to measure the run time needed for the processing of the library call as well as the energy needed to perform the library call on the selected processing platform. The respective library call is then executed and the measured run time and the measured energy are sent to the affinity table module 304. Then the affinity table module 304 updates the affinity table 700 accordingly, i.e. it update the corresponding call signatures of the affinity table 700 with the measured performance parameters of the library call.

According to another embodiment the interposer 103 is configured to provide an auto adjust-mode in which the selection module 303 runs mainly in the production mode and partly in the auto-tune mode. This allows fine-tuning the affinity table 700 during normal operation of the interposer 103. As an example, in the auto-adjust mode every $100^{th}$ library call may be performed in the auto-tune mode to update the affinity table, while for the other 99 library calls the normal production mode is used without adding additional code by the instrumentation module 306.

The execution of the library calls is performed/controlled by an execution module 307.

Figure 4:
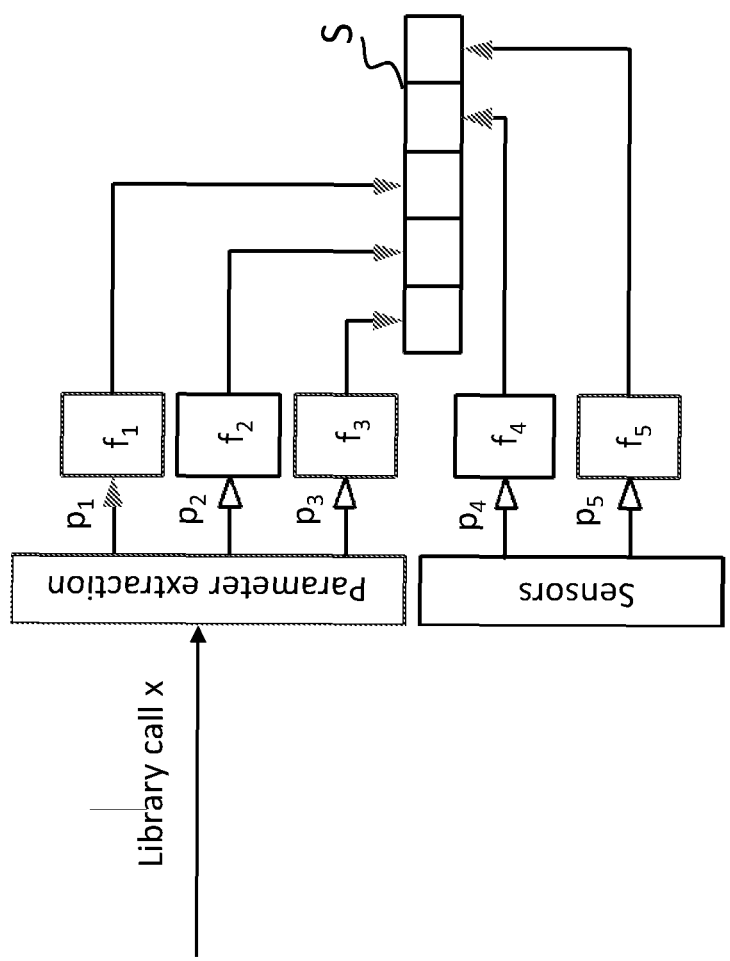
FIG. 4 illustrates the generation of call signatures.

FIG. 4 illustrates the generation of call signatures in more detail.

At first a library call x is received from the API 102 by the interposer 103. Then the interposer 103, and more specifically the parameter extraction module 302, extracts a plurality of library call parameters of the library call x. In this example it is assumed that the library call is a call to perform a matrix multiplication and that the three library call parameters $p_1$, $p_2$ and $p_3$ have been extracted from the library call. The parameters $p_1$, $p_2$ and $p_3$ may be e.g. the dimensions of the matrix. In addition, two system state parameters $p_4$ and $p_5$ are measured by sensors of the heterogeneous system 100. The system state parameters $p_4$ and $p_5$ may be e.g. the temperature of the processing platforms 104 and the utilization or processing load of the processing platforms 104. After the parameter extraction the interposer 103 generates a call signature S for the library call X by means of hash functions. In this example a hash function $f_1$ is applied to the parameter $p_1$, a hash function $f_2$ is applied to the parameter $p_2$, a hash function $f_3$ to the parameter $p_3$, a hash function $f_4$ to the parameter $p_4$ and a hash function $f_5$ to the parameter $p_5$. The hash functions map the input parameters of the library call to parameter classes of the library call. Both parts, i.e. the parameter classes of the library call parameters as well as the parameter classes for the system state parameters form the call signature S. As an example, for a "size" parameter such as the dimensions of the matrix, parameters from 0 to 1024 could be mapped to a parameter class 0 and parameters greater than 1024 could be mapped to a parameter class 1.

As a result, the call signature S has been generated. The call signature S represents a sample library call. In production mode, the respective call signature S is used as address to enter the affinity table 700 and look up the corresponding performance parameters for the call signature S in the affinity table 700. The affinity table 700 may be considered as a 3-dimensional table, wherein one dimension comprises the number of processing platforms 104. Then the interposer 103 looks up for the respective signature S the corresponding performance parameters in the columns 712 and 713. In this example the performance parameters are the run time and the energy consumption of the sample library call with the call signature S.

The call signature S represents the column 710 of the affinity table 710. The call signature S may also be considered as an address to the affinity table. According to embodiments the affinity table may be considered to have a size of Z×A×D, where Z is the number of call signatures, A is the number of performance parameters and D is the number of available processing platforms.

Figure 5:
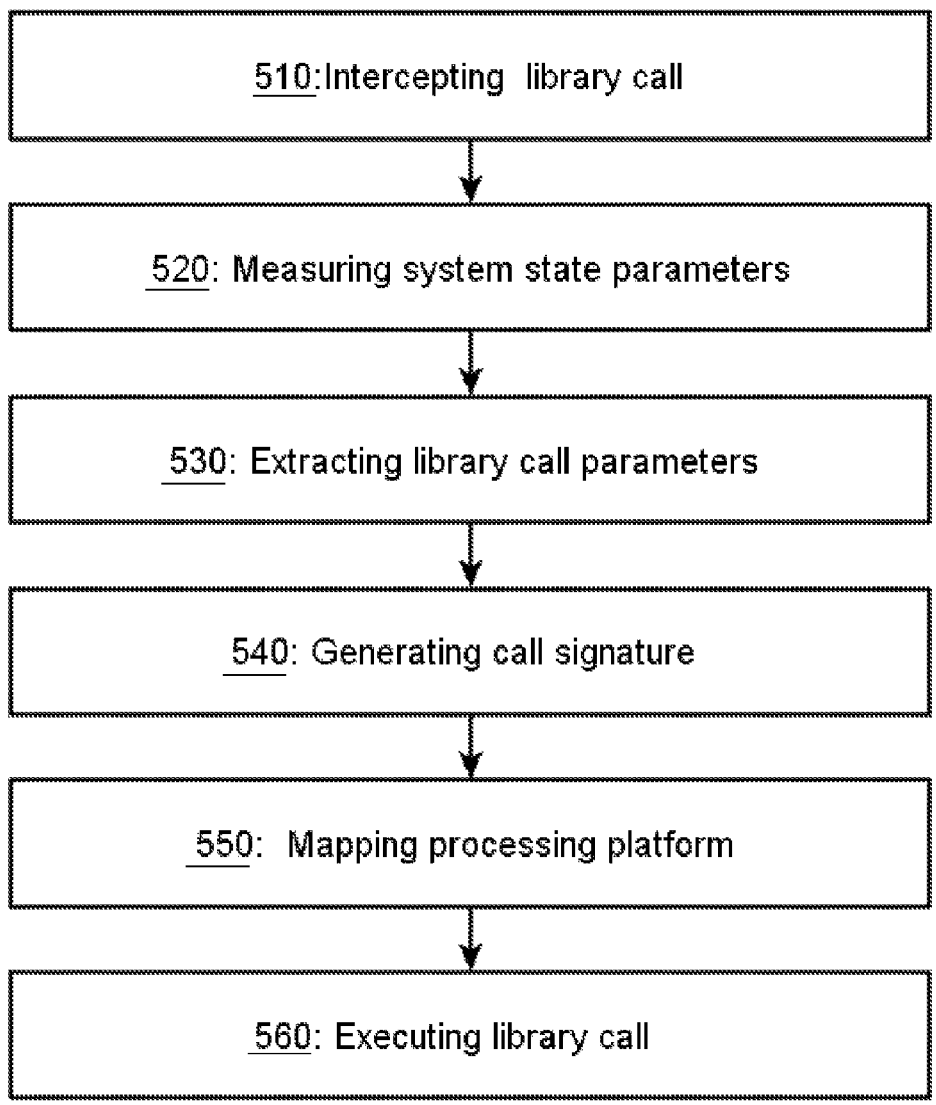
FIG. 5 shows a flow chart of methods steps performed in a production mode of a heterogeneous system according to an embodiment of the invention.

FIG. 5 shows a flow chart of methods steps performed in a production mode of a heterogeneous system according to an embodiment of the invention.

At a step 510, a library call is intercepted by the interposer 103.

At a step 520, system state parameters are measured by sensors of the system state module 301 of the heterogeneous system 100.

At a step 530, library call parameters are extracted by the extraction module 302 from the library call.

At a step 540, a call signature is generated from the system state parameters and the library call parameters by applying the corresponding hash functions.

At a step 550, the library call is mapped to one of the processing platforms 104, thereby selecting one of the processing platforms 104 for execution.

At a step 560, the library call is executed by the selected processing platform 104. Here it should be noted that the function call that is dispatched to the selected library of the selected processing platform might involve a transformation of the actual call signature if the same operations have different signatures in the processing platform libraries.

Figure 6:
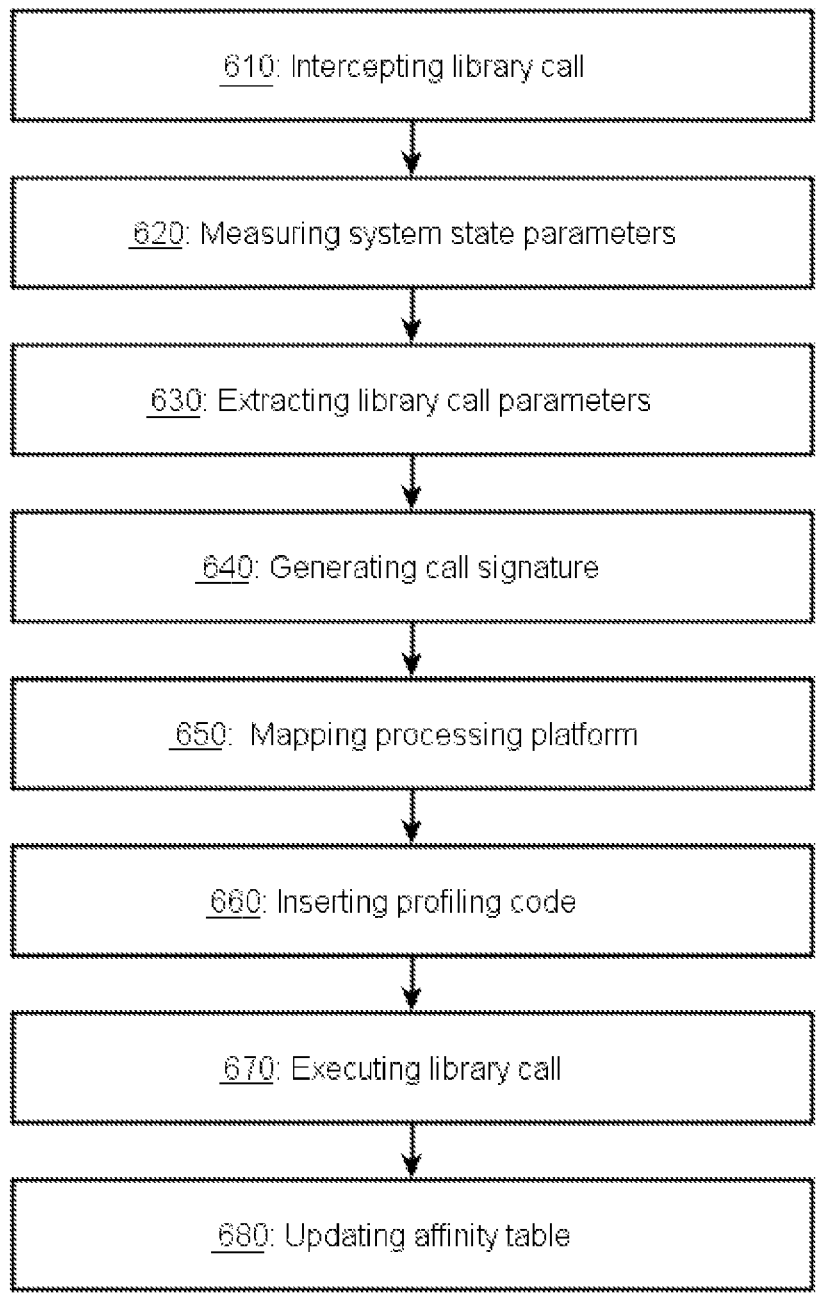
FIG. 6 shows a flow chart of methods steps performed in an auto-tune mode of a heterogeneous system according to an embodiment of the invention.

FIG. 6 shows a flow chart of methods steps performed in an auto-tune mode of a heterogeneous system according to an embodiment of the invention.

At a step 610, a library call is intercepted by the interposer 103.

At a step 620, system state parameters are measured by sensors of the system state module 301 of the heterogeneous system 100.

At a step 630, library call parameters are extracted by the extraction module 302 from the library call.

At a step 640, a call signature is generated from the system state parameters and the library call parameters by applying the corresponding hash functions.

At a step 650, the library call is mapped to one of the processing platforms 104, thereby selecting one of the processing platforms 104 for execution. In the auto-tune mode, the selection module 303 may select randomly one of the processing platforms 104. Preferably the selection unit 303 takes the column 711 of the affinity table into account which comprises the count of the respective call signature to ensure a uniform distribution of the signature count over all processing platforms 104. As an example, if the CPU 105 and the GPU 106 have already a count value 4 for the respective call signature and the FPGA 107 has only a count value 3, the selection module 303 would select the FPGA 107. In other words, in the auto-tune mode the selection module 303 selects the processing platform with the lowest count value.

At a step 660 the instrumentation module 306 profiles/adds code into the current program stream in order to initialize the measurement of one or more performance parameters for the current library call. The added code will then trigger the corresponding sensors to measure the desired performance parameters for the library call, e.g. the run time for executing the library call and the energy consumed for executing the library call.

At a step 670 the current library call is executed. In the execution phase, additional processes/threads might be spawned that keep track of the sensors.

At a step 680 the corresponding call signatures of the affinity table 700 are updated. In this example the performance parameters would be added to the sub-table 703 of the affinity table 700 and the counter value would then be set to 4. According to embodiments the performance parameters are computed as running average of the profiled attributes, preferably with a weight function to favor recent calls.

Hence the affinity table 700 can be populated with measured sensor-information and metadata (counted executions of the respective sample library call).

Generally the sensor information that is stored as performance parameters in the affinity table 700 might be any subset of the accessible sensors.

Figure 8:
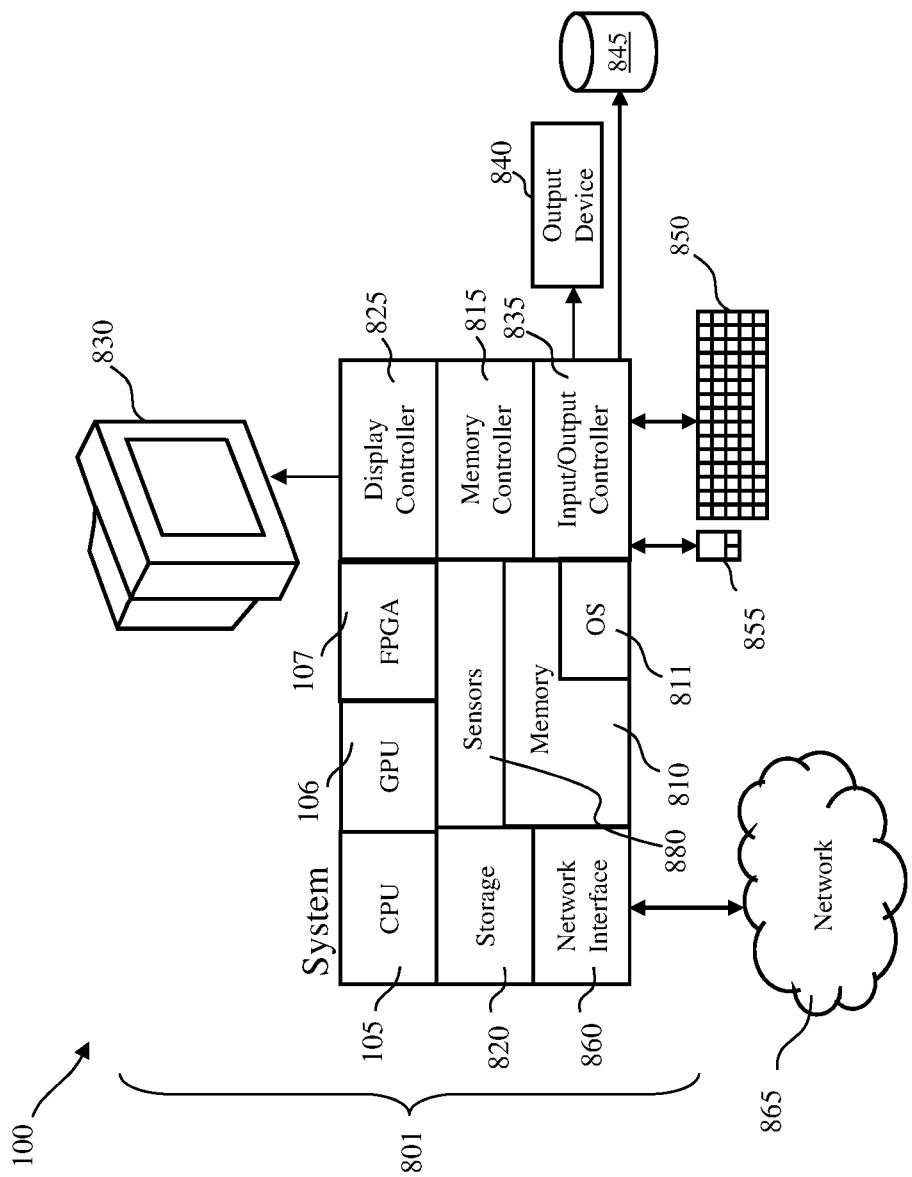
FIG. 8 shows another block diagram of a heterogeneous system according to an embodiment of the invention.

FIG. 8 shows a schematic block diagram of a heterogeneous system 100 according to an embodiment of the invention. In exemplary embodiments, in terms of hardware architecture, as shown in FIG. 8, the system 100 includes as processing platforms a CPU 105, a GPU 106 and a FPGA 107. The system further includes memory 810 coupled to a memory controller 815, and one or more input and/or output (I/O) devices 840, 845, 850, 855 (or peripherals) that are communicatively coupled via a local input/output controller 835. The input/output controller 835 can be, but is not limited to, one or more buses or other wired or wireless connections, as is known in the art. The input/output controller 835 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The CPU 105 is a hardware device for executing software, particularly that stored in memory 810. The CPU 105 can be any custom made or commercially available processor. The GPU 106 and the FPGA 107 are co-processing units for the CPU 105, in particular to perform specialized processing tasks.

The memory 810 can include any one or combination of volatile memory elements (e.g., random access memory) and nonvolatile memory elements. Moreover, the memory 810 may incorporate electronic, magnetic, optical, and/or other types of storage media. Note that the memory 810 can have a distributed architecture, where various components are situated remote from one another, but can be accessed by the CPU 105.

The software in memory 810 may include one or more separate programs, in particular a program for performing anonymous read/write accesses to a central cloud server. In the example of FIG. 8, the software in the memory 810 includes methods described herein in accordance with exemplary embodiments and a suitable operating system (OS) 811. The OS 811 essentially controls the execution of other computer programs, such as the methods as described herein, and provides scheduling, input-output control, file and data management, memory management, and communication control and related services.

Possibly, a conventional keyboard 850 and mouse 855 can be coupled to the input/output controller 835 (in particular for the BS, if needed).

In addition, the I/O devices 840-855 may further include devices that communicate both inputs and outputs. The system 100 can further include a display controller 825 coupled to a display 840. In exemplary embodiments, the system 800 can further include a network interface or transceiver 860 for coupling to a network 865.

The network 865 transmits and receives data between the system 100 and external systems. The network 865 is possibly implemented in a wireless fashion, e.g., using wireless protocols and technologies, such as Wi-Fi, WiMax, etc. The network 865 may be a fixed wireless network, a wireless local area network (LAN), a wireless wide area network (WAN) a personal area network (PAN), a virtual private network (VPN), intranet or other suitable network system and includes equipment for receiving and transmitting signals.

In exemplary embodiments, network 865 can be a managed IP network administered by a service provider. Besides, the network 865 can be a packet-switched network such as a LAN, WAN, Internet network, etc.

If the unit 801 is a PC, workstation, intelligent device or the like, the software in the memory 810 may further include a basic input output system (BIOS). The BIOS is stored in ROM so that the BIOS can be executed when the unit 801 is activated.

When the system 100 is in operation, the CPU 105 is configured to execute software, in particular software comprising a software stack as illustrated with reference to FIG. 2, stored within the memory 810, to communicate data to and from the memory 810, and to generally control operations of the system 100 pursuant to the software. The methods described herein and the OS 811, in whole or in part are read by the CPU 105, typically buffered within the CPU 105, and then executed. The software may intercept library calls and map the library calls to either the CPU 105, the GPU 106 or the FPGA 107.

The system 100 further comprises sensors 880 for measuring system state parameters of the system 100 as well as performance parameters of library calls. The sensors may be configured to measure temperature, electric current, energy and/or power consumed by the processing platforms, the utilization of the processing platforms, the bandwidth utilization; and/or the network utilization. The sensors may also be external sensors connected to the system 100.

The present invention may be a system, a method, and/or a computer program product. The computer program product may include a computer readable storage medium (or media) having computer readable program instructions thereon for causing a processor/processing platform to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A heterogeneous system for dynamically mapping library calls to one of a plurality of processing platforms, the plurality of processing platforms comprising a central processing unit (CPU) and one or more acceleration units as co-processing units, the system comprising:
an interposer configured to:
intercept the library calls from an application programming interface (API); and
map the library calls to one of the plurality of processing platforms according to a classification scheme based on an affinity table, the affinity table comprising:
call signatures representing input parameters of sample library calls; and
one or more performance parameters of the sample library calls for each of the processing platforms, the performance parameters indicating the performance of the sample library calls on the respective processing platform.

2. The system according to claim 1, wherein the interposer comprises:
a system state module for measuring one or more system state parameters of the heterogeneous system;
a parameter extraction module for extracting one or more parameters of library calls to be mapped;
an affinity table module for storing the affinity table; and
a selection module for selecting one of the plurality of processing platforms for the library calls to be mapped.

3. The system according to claim 1, wherein the interposer is configured to provide:
a production mode in which a selection module is adapted to select at runtime the best processing platform for a library call to be mapped based on the affinity table.

4. The system according to claim 1, wherein a selection module is provided and is configured to select at runtime the best processing platform for a library call based on the affinity table and
a weight function representing one or more system state parameters of a current system state.

5. The system according to claim 1, wherein the interposer is configured to provide an auto-tune mode in which a selection module is provided and is adapted to:
select one of the processing platforms for a library call to be mapped;
insert profiling code into a current program stream;
execute the library call; and
update the corresponding call signatures of the affinity table with measured performance parameters of the library call.

6. The system according to claim 5, wherein the interposer is configured to provide
an auto adjust-mode in which the selection module is adapted to run mainly in a production mode and partly in the auto-tune mode.

7. The system according to claim 1, wherein the interposer comprises:
an instrumentation module configured to insert profiling code into a current program stream, the profiling code being configured to initialize the measurement of one or more system parameters for the current library call.

8. The system according to claim 1, wherein the interposer is configured to generate the call signatures by means of one or more hash functions, wherein the hash functions map input parameters of a library call to parameter classes of the library call.

9. The system according to claim 1, wherein the input parameters comprise one or more system state parameters and one or more library call parameters.

10. The system according to claim 9, wherein the system comprises one or more sensors configured to measure one or more of the following parameters as system state parameters and/or performance parameters for the respective library calls:
run time of a library call;
temperature;
electric current;
energy and/or power consumed by the processing platforms;
utilization of the processing platforms;
bandwidth utilization; and
network utilization.

11. The system according to claim 10, wherein the library call parameters are size parameters related to the size of the arguments of a function to be executed by the corresponding library.

12. The system according to claim 1, wherein the acceleration units are selected from the group consisting of:
a graphics processing unit (GPU); and
a Field Programmable Gate Array (FPGA).

13. A computer-implemented method for dynamically mapping library calls to one of a plurality of processing platforms, the plurality of processing platforms comprising a central processing unit (CPU) and one or more acceleration units as co-processing units, the method comprising:
intercepting the library calls from an application programming interface (API); and
mapping the library calls to one of the plurality of processing platforms according to a classification scheme based on an affinity table, the affinity table comprising:
call signatures representing input parameters of sample library calls; and
one or more performance parameters of the sample library calls for each of the processing platforms, the performance parameters indicating the performance of the sample library calls on the respective processing platform.

14. The computer-implemented method according to claim 13, further comprising:
measuring, by a system state module one or more system state parameters of the heterogeneous system;
extracting, by an extraction module, one or more library call parameters, from a library call to be mapped;
generating a call signature for the library call; and
selecting, by a selection module, one of the plurality of processing platforms for the execution of the library call, thereby mapping the library call to the selected processing platform.

15. The computer-implemented method according to claim 13, further comprising:
selecting, by a selection module, one of the processing platforms for a current library call to be mapped;
inserting, by an instrumentation module, profiling code into a current program stream, the profiling code being configured to initialize the measurement of one or more system parameters for the current library call;
executing the current library call; and
updating the corresponding call signatures of the affinity table with measured performance parameters of the current library call.

16. The computer-implemented method according to claim 13, further comprising:

generating call signatures via one or more hash functions, wherein the hash functions map input parameters of a library call to parameter classes of the library call.

17. The computer-implemented method according to claim 13, wherein the input parameters comprise one or more system state parameters and one or more library call parameters.

18. A computer program product for dynamically mapping library calls to one of a plurality of processing platforms of a heterogeneous system, the plurality of processing platforms comprising a central processing unit (CPU) and one or more acceleration units as co-processing units,
the computer program product comprising a computer readable storage medium having program instructions embodied therewith, the program instructions executable by the system to cause the system to perform a method comprising:
intercepting the library calls from an application programming interface (API); and
mapping the library calls to one of the plurality of processing platforms according to a classification scheme based on an affinity table, the affinity table comprising:
call signatures representing input parameters of sample library calls; and
one or more performance parameters of the sample library calls for each of the processing platforms, the performance parameters indicating the performance of the sample library calls on the respective processing platform.

19. The computer program product according to claim 18, the method further comprising:
measuring, by a system state module one or more system state parameters of the heterogeneous system;
extracting, by an extraction module, one or more library call parameters, from a library call to be mapped;
generating a call signature for the library call; and
selecting, by a selection module, one of the plurality of processing platforms for the library call.

20. The computer program product according to claim 18, the method further comprising:
selecting, by a selection module, one of the processing platforms for a current library call to be mapped;
inserting, by an instrumentation module, profiling code into a current program stream, the profiling code being configured to initialize the measurement of one or more system parameters for the current library call;
executing the current library call; and
updating the corresponding call signatures of the affinity table with measured performance parameters of the current library call.

* * * * *